US008812692B2

(12) United States Patent
Sakiyama et al.

(10) Patent No.: US 8,812,692 B2
(45) Date of Patent: Aug. 19, 2014

(54) DATA TRANSMISSION SYSTEM, DESTINATION MANAGEMENT DEVICE, DATA TRANSMISSION DEVICE, ADDRESS BOOK ACQUISITION METHOD AND PROGRAM

(75) Inventors: Daisuke Sakiyama, Kawanishi (JP); Mitsuzo Iwaki, Osaka (JP); Kenichi Takahashi, Sennan-gun (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 509 days.

(21) Appl. No.: 12/197,718

(22) Filed: Aug. 25, 2008

(65) Prior Publication Data

US 2009/0070451 A1    Mar. 12, 2009

(30) Foreign Application Priority Data

Sep. 7, 2007    (JP) ................. 2007-232213

(51) Int. Cl.
*G06F 15/16*    (2006.01)
(52) U.S. Cl.
USPC .............................. 709/228; 358/400; 359/17
(58) Field of Classification Search
USPC .................................................. 709/223, 228
See application file for complete search history.

(56) References Cited

U.S. PATENT DOCUMENTS

| | | | | |
|---|---|---|---|---|
| 6,981,036 B1 * | 12/2005 | Hamada | ........................ | 709/223 |
| 6,985,242 B1 | 1/2006 | Toyoda | | |
| 7,130,066 B1 * | 10/2006 | Kanematu | .................... | 358/1.15 |
| 2005/0165808 A1 * | 7/2005 | Ohtani et al. | ................. | 707/100 |
| 2005/0289126 A1 * | 12/2005 | Koguchi | ........................... | 707/3 |
| 2006/0001907 A1 * | 1/2006 | Kumagai | ..................... | 358/1.15 |
| 2006/0044587 A1 * | 3/2006 | Yoshida | ....................... | 358/1.13 |
| 2006/0168344 A1 | 7/2006 | Tsuchiya | | |
| 2006/0209333 A1 * | 9/2006 | Takida | ......................... | 358/1.15 |
| 2007/0070401 A1 * | 3/2007 | Okamoto et al. | ............. | 358/1.15 |
| 2007/0073666 A1 * | 3/2007 | Kawai | .............................. | 707/3 |
| 2007/0086580 A1 * | 4/2007 | Wakazono | ................. | 379/88.17 |
| 2007/0130135 A1 * | 6/2007 | Hagiuda | ........................... | 707/4 |
| 2008/0060070 A1 * | 3/2008 | Uno | ................................ | 726/21 |
| 2008/0320110 A1 * | 12/2008 | Pathak | ......................... | 709/220 |

FOREIGN PATENT DOCUMENTS

| | | |
|---|---|---|
| JP | 2003-259031 | 9/2003 |
| JP | 2004-185423 | 7/2004 |
| JP | 2006-157922 | 6/2006 |
| JP | 2007-228346 | 9/2007 |

OTHER PUBLICATIONS

Notification of Reasons for Refusal in JP 2007-232213 dated Jun. 23, 2009, and an English Translation thereof.

* cited by examiner

*Primary Examiner* — Tauqir Hussain
(74) *Attorney, Agent, or Firm* — Buchanan Ingersoll & Rooney PC

(57) ABSTRACT

When a destination management device requests an address book of each user, a data transmission device transmits the address book to the destination management device. The destination management device stores the address book received from the data transmission device. If location information of destination information is included in the address book, the destination management device transmits the location information to the data transmission device. The data transmission device transmits the location information to an LDAP server to request the destination information. Upon receipt of the destination information, the data transmission device transmits the destination information to the destination management device.

8 Claims, 10 Drawing Sheets

FIG. 10

| DESTINATION NAME | REAL ADDRESS | LOCATION INFORMATION | REAL ADDRESS ACQUISITION DATE AND TIME |
|---|---|---|---|
| DESTINATION A | aaa@aa.com | — | — |
| DESTINATION B | bbb@bb.com | link:xxx.xxx.xxx.xxx | 2007/03/01 15:32 |
| DESTINATION C | ftp://hoge.net/cc | — | — |
| DESTINATION D | box:123.123.123.123/ddd | — | — |

DATA TRANSMISSION SYSTEM, DESTINATION MANAGEMENT DEVICE, DATA TRANSMISSION DEVICE, ADDRESS BOOK ACQUISITION METHOD AND PROGRAM

CROSS-REFERENCE TO RELATED APPLICATIONS

This application is based on application No. 2007-232213 filed in Japan, the contents of which are hereby incorporated by reference.

BACKGROUND OF THE INVENTION

1. Field of the Invention

The present invention relates to a data transmission system, destination management device, data transmission device, address book acquisition method and program, and in particular to a technique for saving the trouble of transferring destination information when installing the destination management device that manages address books that each correspond to a different user of the data transmission device.

2. Description of the Related Art

In MFPs (Multi Function Peripheral) of recent years that transmit image data with use of a communication means, such as a facsimile and an electronic mail, a user generally registers a list of destinations (address book) in advance to save the trouble of entering a destination, and selects the destination from the list.

However, when using a plurality of MFPs, a user takes trouble in registering destinations for each of the MFPs. To avoid the trouble, it is possible to use a so-called "directory service", and provide, from the directory server, the destination information registered in the address book.

For example, an LDAP (Lightweight Directory Access Protocol) allows a user to use the same address book among the plurality of MFPs, thereby improving the convenience of the user. The LDAP can also provide devices connected via a network, such as MFPs, with various types of information in addition to the destination information.

However, in a case where a plurality of users share an MFP, the number of destinations to be registered in an address book becomes large, resulting in making it difficult to find a desired address. Also, there may be a case where a user needs to register an address that he/she does not wish other users to know. This has created a demand for a technique using a destination management device that manages the address books that each correspond to a different one of the users.

In a case where the destination management device is newly installed while the directory server already exists, it is necessary to transfer the destination information managed by the directory server into the destination management device. However, if the destination management device cannot access the directory server (if the device does not have an access right), it is more troublesome to transfer the destination information.

SUMMARY OF THE INVENTION

In view of the above-described problems, the object of the present invention is to provide a data transmission system, destination management device, data transmission device, address book acquisition method and program that save the trouble of transferring destination information when installing the destination management device.

The above object is fulfilled by a data transmission system connected, via a network, to a data storage device storing destination information without correlation between users and the destination information, the data transmission system comprising: a data transmission device; and a destination management device for managing the destination information for each user, the data transmission device including: an address book storage that stores, for each user, an address book on which at least one destination information piece is listed; an address book transmitter operable to transmit the address book to the destination management device when requested by the destination management device; a location information receiver operable to receive, from the destination management device, location information that is included in the transmitted address book and that indicates where in the data storage device the destination information piece is stored; a destination information acquirer operable to acquire, from the data storage device, a destination information piece indicated by the location information received from the destination management device; and a destination information transmitter operable to transmit, to the destination management device, the destination information piece acquired from the data storage device, and the destination management device including: an address book receiver operable to receive the address book from the data transmission device; a location information transmitter operable to transmit the location information to the data transmission device, when the location information is included in the address book received from the data transmission device; a destination information receiver operable to receive, from the data transmission device, the destination information piece indicated by the location information; and a destination information register operable to register the received destination information piece in the received address book.

The present invention provides a destination management device that is connected, via a network, to a data storage device storing destination information without correlation between users and the destination information and to a data transmission device, and that is for managing the destination information for each user, the destination management device comprising: an address book receiver operable to receive an address book of each user from the data transmission device, the address book having listed thereon at least one destination information piece; a location information transmitter operable to transmit, to the data transmission device, location information that is included in the received address book and that indicates where in the data storage device the destination information piece is stored; a destination information receiver operable to receive, from the data transmission device, the destination information piece indicated by the location information; and a destination information register operable to register the received destination information piece in the received address book.

The present invention provides a data transmission device connected, via a network, to a destination management device for managing destination information for each user and to a data storage device storing the destination information without correlation between the users and the destination information, the data transmission device comprising: an address book storage that stores, for each user, an address book on which at least one destination information piece is listed; an address book transmitter operable to transmit the address book to the destination management device when requested by the destination management device; a location information receiver operable to receive, from the destination management device, location information that is included in the transmitted address book and that indicates where in the data storage device the destination information piece is stored; a destination information acquirer operable to acquire, from the data storage device, a destination information piece indicated by the location information received from the destination management device; and a destination information transmitter operable to transmit, to the destination management device, the destination information piece acquired from the data storage device.

The present invention provides an address book acquisition method executed in a data transmission system including (i) a destination management device for managing destination information for each user and (ii) a data transmission device, the data transmission system being connected, via a network, to a data storage device storing the destination information without correlation between the users and the destination information, the address book acquisition method comprising the steps of: when the destination management device requests an address book of each user on which at least one destination information piece is listed, transmitting the address book from the data transmission device to the destination management device; when location information that indicates where in the data storage device the destination information piece is stored is included in the address book received from the data transmission device, transmitting the location information from the destination management device to the data transmission device; the data transmission device acquiring, from the data storage device, a destination information piece indicated by the location information received from the destination management device; transmitting, from the data transmission device to the destination management device, the destination information piece acquired from the data storage device; and the destination management device registering, in the received address book, the destination information piece received from the data transmission device.

The present invention provides a program stored on a computer readable medium for causing a computer to execute processing, the computer being included in a destination management device that is for managing the destination information for each user and that is connected, via a network, to a data storage device storing destination information without correlation between the users and the destination information and to a data transmission device, the program comprising the steps of: receiving an address book of each user from the data transmission device, the address book having listed thereon at least one destination information piece; transmitting, to the data transmission device, location information that is included in the received address book and that indicates where in the data storage device the destination information piece is stored; receiving, from the data transmission device, the destination information piece indicated by the location information; and registering the received destination information piece in the received address book.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 10 is a table showing the data structure of the address book, which is different for each user, according to the variation (1) of the present invention.

DESCRIPTION OF PREFERRED EMBODIMENTS

The following describes a data transmission system, destination management device, data transmission device, address book acquisition method and program as a preferred embodiment of the present invention, with reference to the attached diagrams.

[1] Structure of Data Transmission System

The following describes the structure of the data transmission system according to the embodiment of the present invention.

Figure 1:
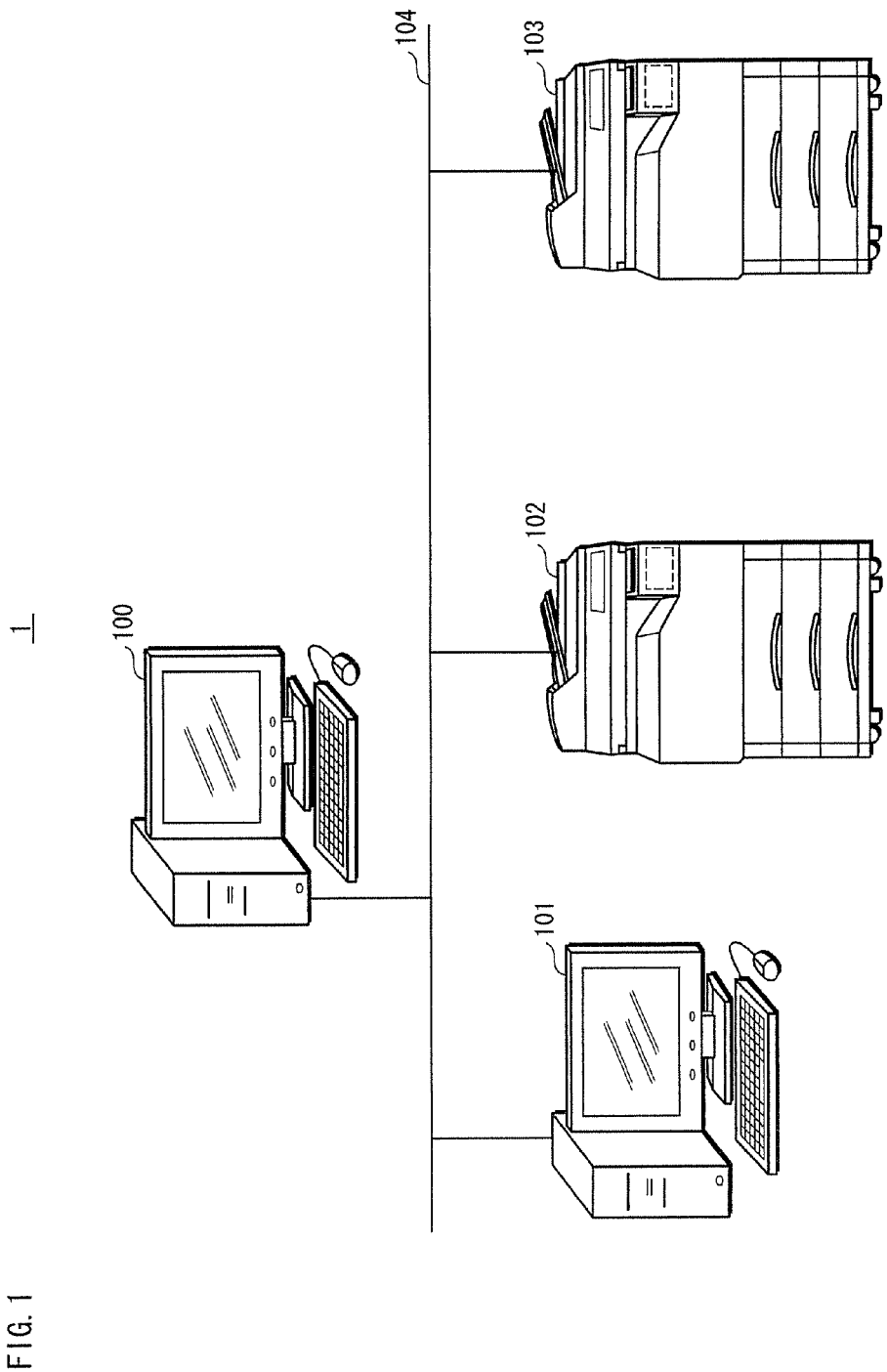
FIG. 1 is a diagram showing the structure of the data transmission system according to an embodiment of the present invention.

As shown in FIG. 1, a data transmission system 1 according to the present embodiment has a structure in which a destination management device 100, an LDAP server 101 as a data storage device, and data transmission devices 102 and 103 are connected to each other via a network 104.

The destination management device 100 stores address books of the registered users of the data transmission devices 102 and 103, and transmits the corresponding address book when requested by the data transmission devices 102 and 103.

The LDAP server 101 has a database for storing destination information and such, and transmits the content stored in the database when requested by an LDAP client (Here, the clients are the data transmission devices 102 and 103). However, the destination management device 100 does not have a right to access the LDAP server 101, and therefore cannot directly acquire the destination information from the LDAP server 101.

The data transmission devices 102 and 103 perform user authentication so that only the registered user can use the data transmission devices 102 and 103. Also, the data transmission devices 102 and 103 acquires the address book of the user from the destination management device 100 before transmitting data and such to other devices, display the content of the address book, and let the user to select the desired destination.

[2] Structure of Destination Management Device

The following describes the structure of the destination management device.

(1) Hardware Structure

Figure 2:
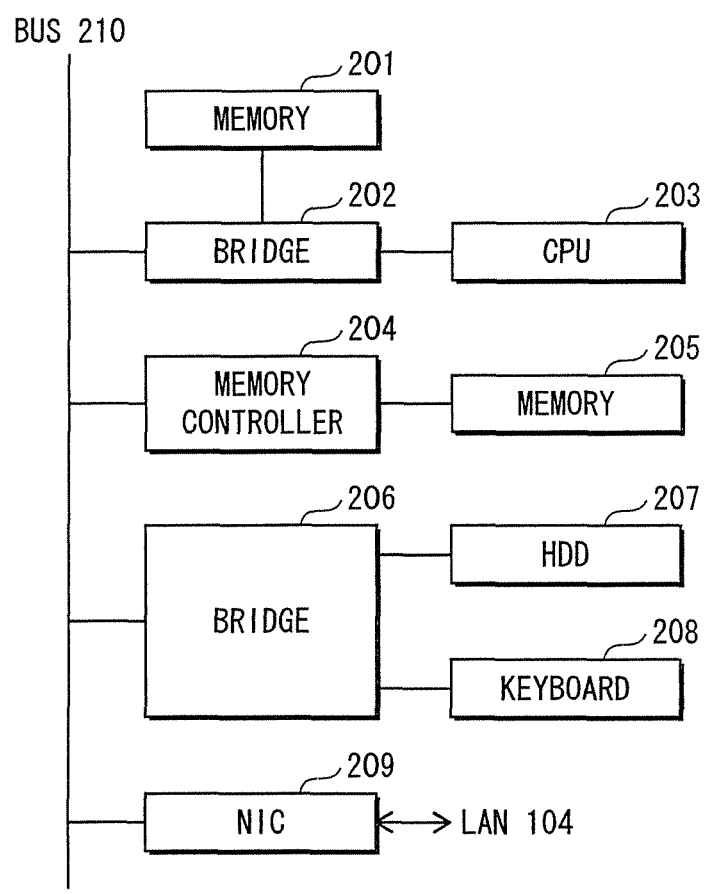
FIG. 2 is a diagram showing the main hardware structure of the destination management device 100 according to the embodiment of the present invention.

FIG. 2 is a diagram showing the main hardware structure of the destination management device 100. As shown in FIG. 2, the destination management device 100 includes a CPU (Central Processing Unit) 203, memories 201 and 205, bridges 202 and 206, a memory controller 204, an HDD (Hard Disk Drive) 207, a keyboard 208, an NIC (Network Interface Card) 209 and a bus 210.

The bridges 202 and 206, the memory controller 204, and the NIC 209 are connected to each other via the bus 210. The CPU 203 and the memory 201 are connected to the bus 210 via the bridge 202. The memory 205 is connected to the bus 210 via the memory controller 204, and the HDD 207 and the keyboard 208 are connected to the bus 210 via the bridge 206.

The NIC 209 communicates with the data transmission devices 102 and 103 via a LAN 104.

(2) Functional Structure

The following describes the functional structure of the destination management device 100.

Figure 3:
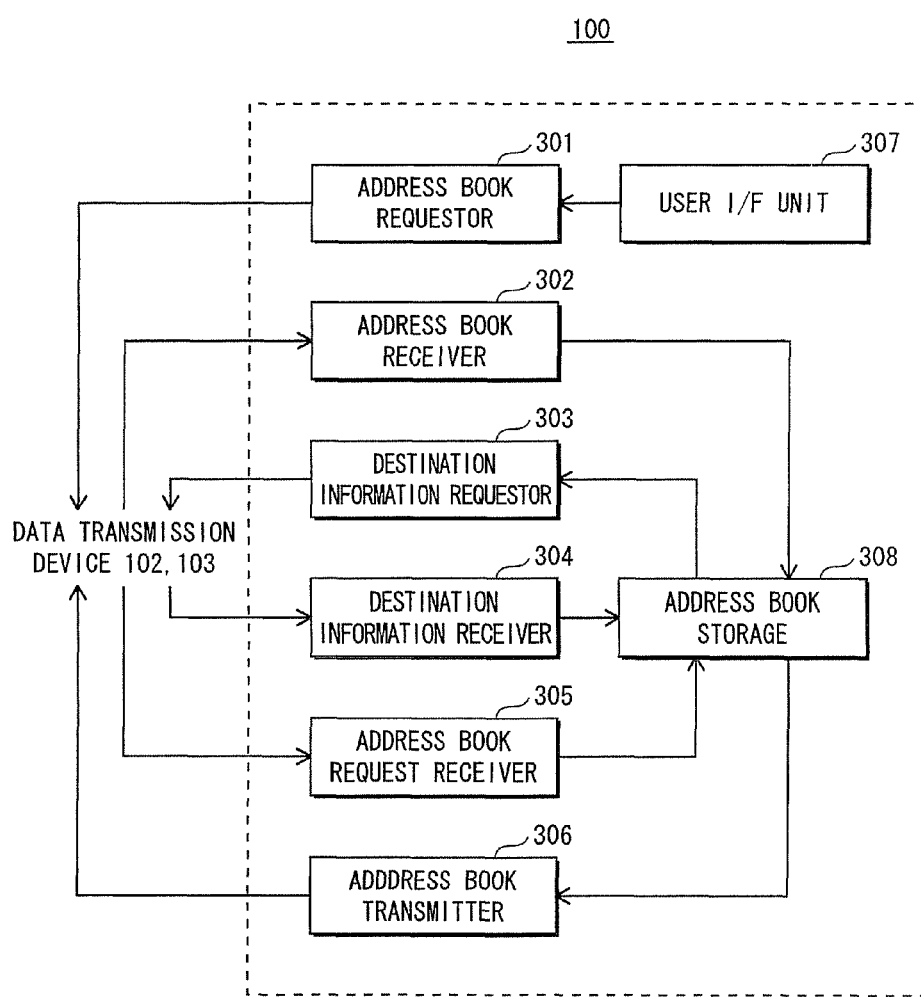
FIG. 3 is a diagram showing the main functional structure of the destination management device 100 according to the embodiment of the present invention.

FIG. 3 is a block diagram showing the main functional structure of the destination management device 100. As shown in FIG. 3, the destination management device 100 includes an address requester 301, an address book receiver 302, a destination information requestor 303, a destination information receiver 304, an address book request receiver 305, an address book transmitter 306, a user interface unit 307, and an address book storage 308.

The address book requester 301 requests the data transmission devices 102 and 103 to transmit the address books that each correspond to a different user. The address book receiver 302 receives the address books of the users from the data transmission devices 102 and 103, and stores the address books in the address book storage 308.

The destination information requester 303 requests the data transmission devices 102 and 103 to acquire the destination information from the LDAP server 101 and to transmit the destination information. The destination information receiver 304 receives the destination information from the data transmission devices 102 and 103, and stores the destination information in the address storage 308.

The address book request receiver 305 receives the requests of address books from the data transmission devices 102 and 103. Upon receipt of the requests, the address book transmitter 306 reads the address books from the address storage 308 and transmits the address books to the data transmission devices 102 and 103 that have made the requests.

Upon receipt of an instruction from the manager of the destination management device 100, the user interface unit 307 instructs the address book requester 301 to request the address books. The destination storage 308 stores address books of the respective users.

[3] Structure of Data Transmission Devices 102 and 103

The following describes the structure of the data transmission device 102. Since the data transmission device 103 has the same structure as the data transmission device 102, the description of the data transmission device 102 is applicable to the description of the data transmission device 103.

(1) Hardware Structure

The following describes the hardware structure of the data transmission device 102.

Figure 4:
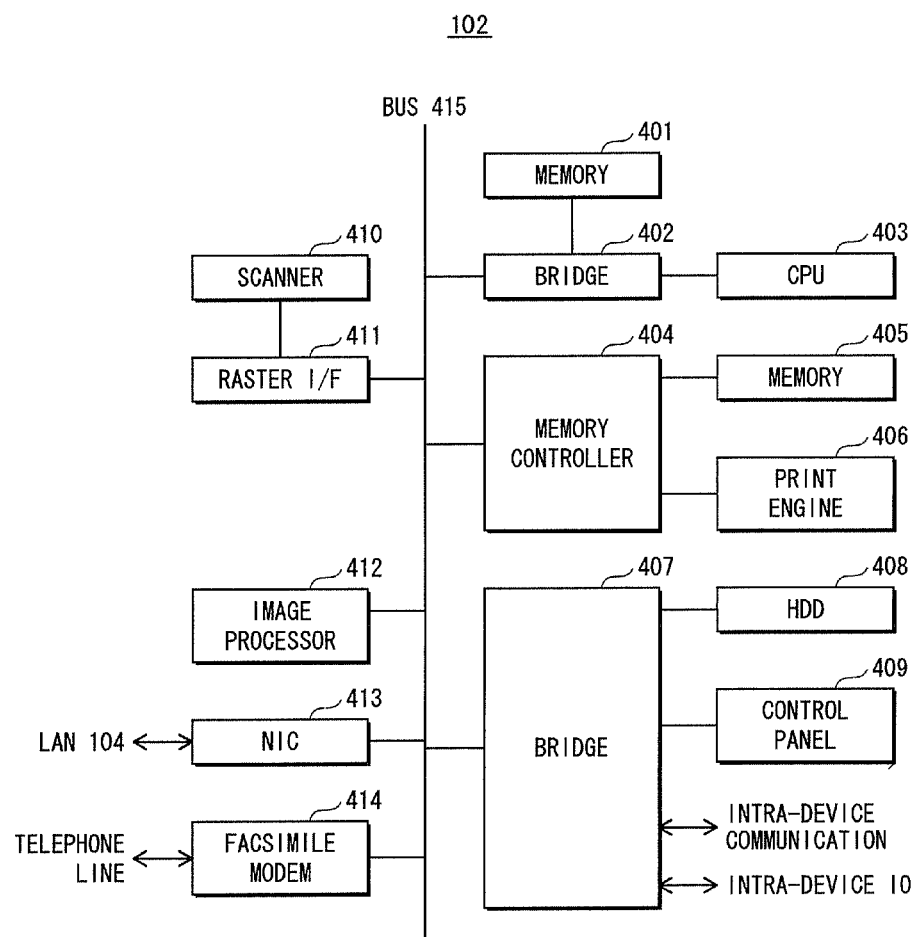
FIG. 4 is a diagram showing the main hardware structure of the data transmission device 102 according to the embodiment of the present invention.

FIG. 4 is a block diagram showing the main hardware structure of the data transmission device 102. As shown in FIG. 4, the data transmission device 102 includes a CPU 403, memories 401 and 405, bridges 402 and 407, a memory controller 404, a printing engine 406, an HDD (Hard Disk Drive) 408, a control panel 409, a scanner 410, a raster interface 411, an image processor 412, an NIC 413, a facsimile modem 414, and a bus 415

The bridges 402 and 407, the memory controller 404, the raster interface 411, the image processor 412, the NIC 413 and the facsimile modem 414 are connected to each other via the bus 415. The CPU 403 and the memory 401 are connected to the bus 415 via the bridge 402. The memory 405 and the print engine 406 are connected to the bus 415 via the memory controller 404, and the HDD 408 and the control panel 409 are connected to the bus 415 via the bridge 407.

The NIC 413 acquires the destination information, and registers, via the LAN 104, the destination information in the destination management device 100. Also, the NIC 413 transmits/receives data according to the protocol on a TCP/IP (Transmission Control Protocol/Internet Protocol) such as SMTP (Simple Mail Transfer Protocol) or a FTP (File Transfer Protocol).

Image data read by the scanner 410 is written onto the memory 405 via the raster interface 411 and such. Then, the image processor 412 reads image data from the memory 405, performs image processing on the image data, and then writes back to the memory 405 the resultant image data on which the image processing has been performed. The resultant image data is then transferred to the print engine 406 via the memory controller 404, and used for image formation.

The image data read by the scanner 410 is transmitted by the NIC 413, with use of a function such as "Scan To E-mail (IETF RFC2305, ITU-T T.37)" or "Scan To FTP (IETF RFC959)".

The HDD 408 stores the destination information. The control panel 409 receives from a user the input of the destination information, and displays the destination information acquired from the destination management device 100.

The facsimile modem 414 is for a facsimile communication via a telephone line, and conforms to the G3 standard. It is apparent that a facsimile modem conforming to a standard other than the G3 standard, such as the G4 standard that uses an ISDN line, can be used instead of the facsimile model conforming to the G3 standard.

Whether using the NIC 413 or the facsimile modem 414, the data transmission device 102 can send data by referring to the destination information included in the address book. Furthermore, the data transmission device 102 may transmit the data with use of the destination information input by a user via the control panel 409.

The data transmission device 102 transmits image data and character data, and may also transmit audio data.

(2) Functional Structure

The following describes the functional structure of the data transmission device 102.

Figure 5:
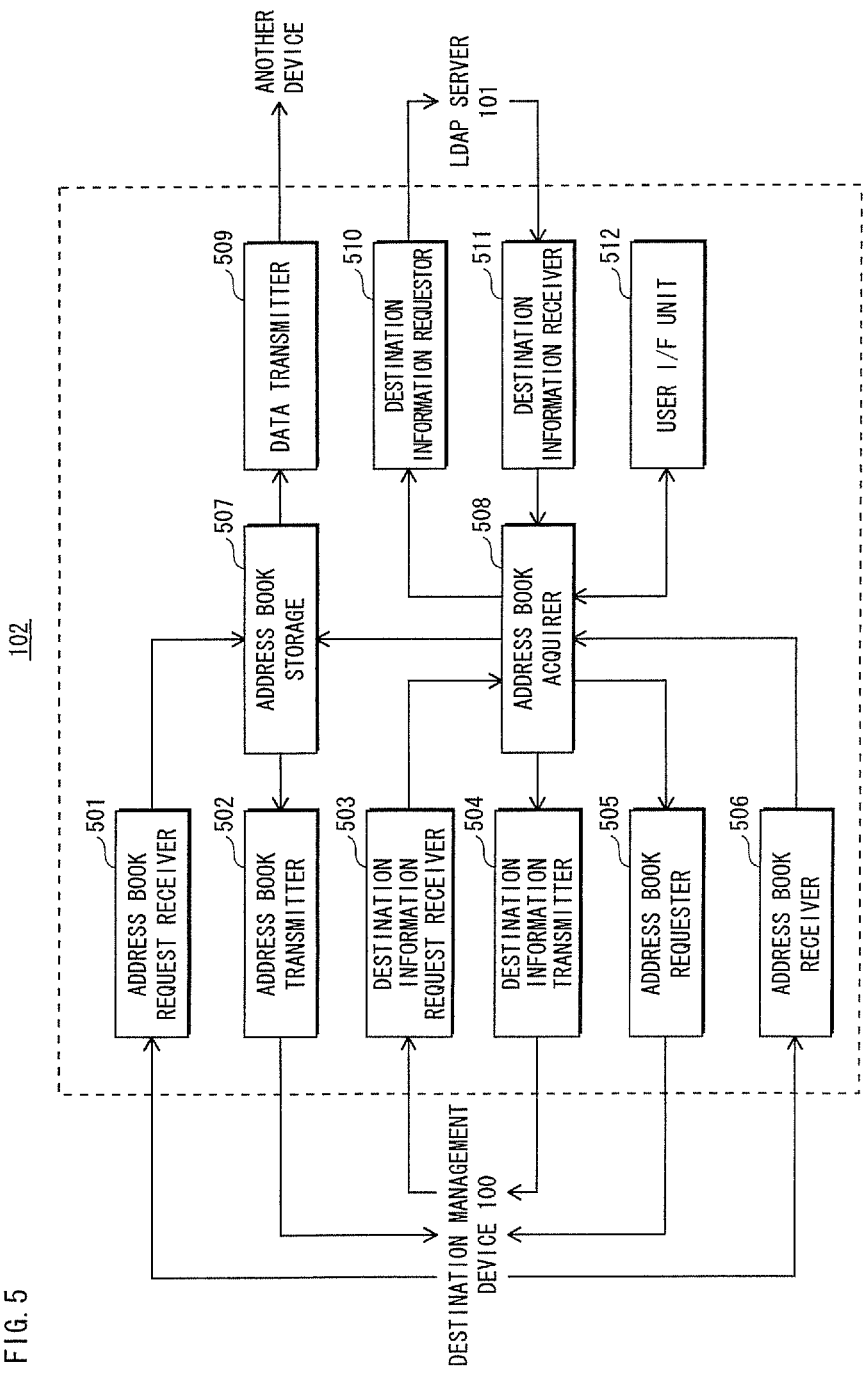
FIG. 5 is a block diagram showing the main functional structure of the data transmission device 102 according to the embodiment of the present invention.

FIG. 5 is a block diagram showing the main functional structure of the data transmission device 102. As shown in FIG. 5, the data transmission device 102 includes an address book request receiver 501, an address book transmitter 502, a destination information request receiver 503, a destination information transmitter 504, an address book requester 505, an address book receiver 506, an address book storage 507, an address book acquirer 508, a data transmitter 509, a destination information requester 510, a destination information receiver 511, and a user interface unit 512.

The address book request receiver 501 receives from the destination management device 100 the request of the address book that is different for each user. The address book transmitter 502 reads from the address book storage 507 the address book of a user, and sends the address book to the destination management device 100.

The destination information request receiver 503 receives, from the destination management device 100, a request of acquiring the destination information from the LDAP server 101 and sending the destination information. The destination information transmitter 504 transmits, to the destination management device 100, the destination information acquired from the LDAP server 101.

The address book requester 505 requests the destination management device 100 for the address book. The address book receiver 506 receives the address book from the destination management device 100.

The address book storage 507 stores the address books of the respective users. The address book acquirer 508 acquires the destination information from the destination management device 100 and the LDAP server 101.

The data transmitter 509 acquires the destination information by referring to the address books stored in the address book storage 507, and sends data to another device according to the destination information.

In this case, the data transmitter 509 uses either the NIC 413 or the facsimile modem 414 to send data, according to the content of the destination information.

The destination information requester 510 requests the destination information from the LDAP server 101. The destination information receiver 511 receives the destination information from the LDAP server 101. The user interface unit 512 informs the address book acquirer 508 that a user has logged in, and displays the destination information that is included in the address book of the user.

[4] Communication Sequence

The following describes a communication sequence in a data transmission system 1. Described here is a communication sequence with the data transmission device 102. However, the description also applies to the case of the data transmission device 103.

Figure 6:
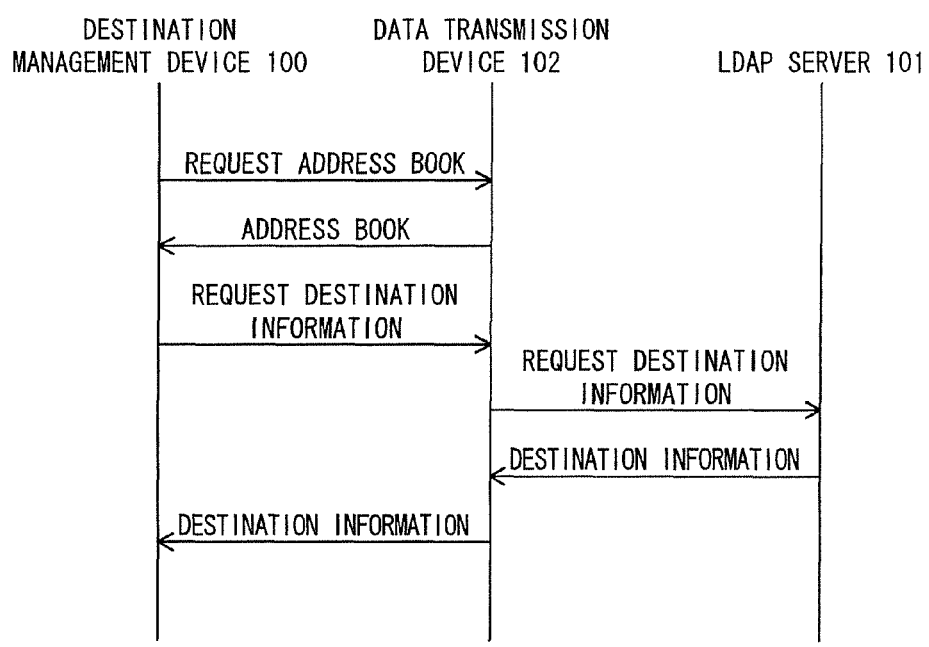
FIG. 6 shows a communication sequence in a case where the destination management device 100 according to the embodiment of the present invention acquires an existing address book.

(1) When the Destination Management Device 100 Acquires an Existing Address Book As shown in FIG. 6, the destination management device 100 first requests, with use of the address book requestor 301, the data transmission device 102 to transmit the address book of each user. Upon receipt of the request, the data transmission device 102 reads from the address book storage 507 the address book of each user, and sends the address book to the destination management device 100.

When the address book receiver 302 of the destination management device 100 has received from the data transmission device 102 the address book of each user, the destination management device 100 stores the address book in the address book storage 308.

In a case where the address book stored in the address book storage 308 includes information that is for acquiring the destination information from the LDAP server 101, and that indicates the location of the destination information (hereinafter referred to as 'location information'), the destination management device 100 transmits, with use of the destination information requestor 303, the location information to the data transmission device 102, and requests the data transmission device 102 to send the destination information whose location is indicated by the location information.

When the destination information request receiver 503 of the data, transmission device 102 has received the request of the destination information from the destination management device 100, the data transmission device 102 refers to the location information. Then, the destination information requester 510 of the data transmission device 102 requests the destination information from the LDAP server 101. The LDAP server 101 transmits the requested destination information to the data transmission device 102. When the destination information receiver 511 of the data transmission device 102 has received the destination information transmitted from the LDAP server 101, the destination information transmitter 504 of the data transmission device 102 transmits the received destination information to the destination management device 100.

(2) When the Data Transmission Device 102 Acquires the Address Book

Figure 7:
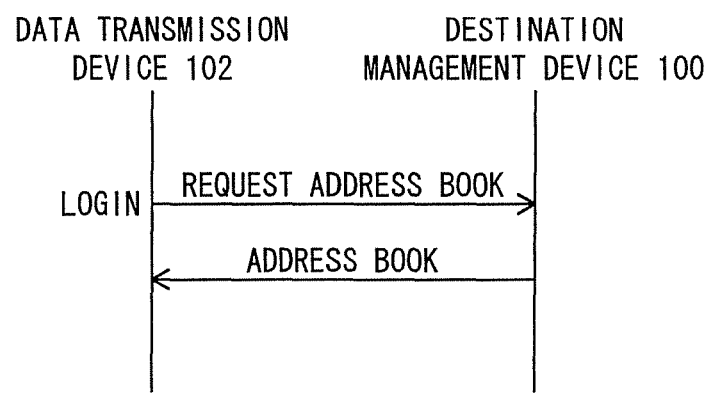
FIG. 7 shows a communication sequence in a case where the data transmission device 102 according to the embodiment of the present invention acquires an address book.

As shown in FIG. 7, when a user has logged in, the data transmission device 102 requests the address book of the user from the destination management device 100. The destination management device 100 transmits, to the data transmission device 102, the address book of the user that has been requested.

[5] Operations of Destination Management Device 100

The following describes the operations of the destination management device 100.

Figure 8:
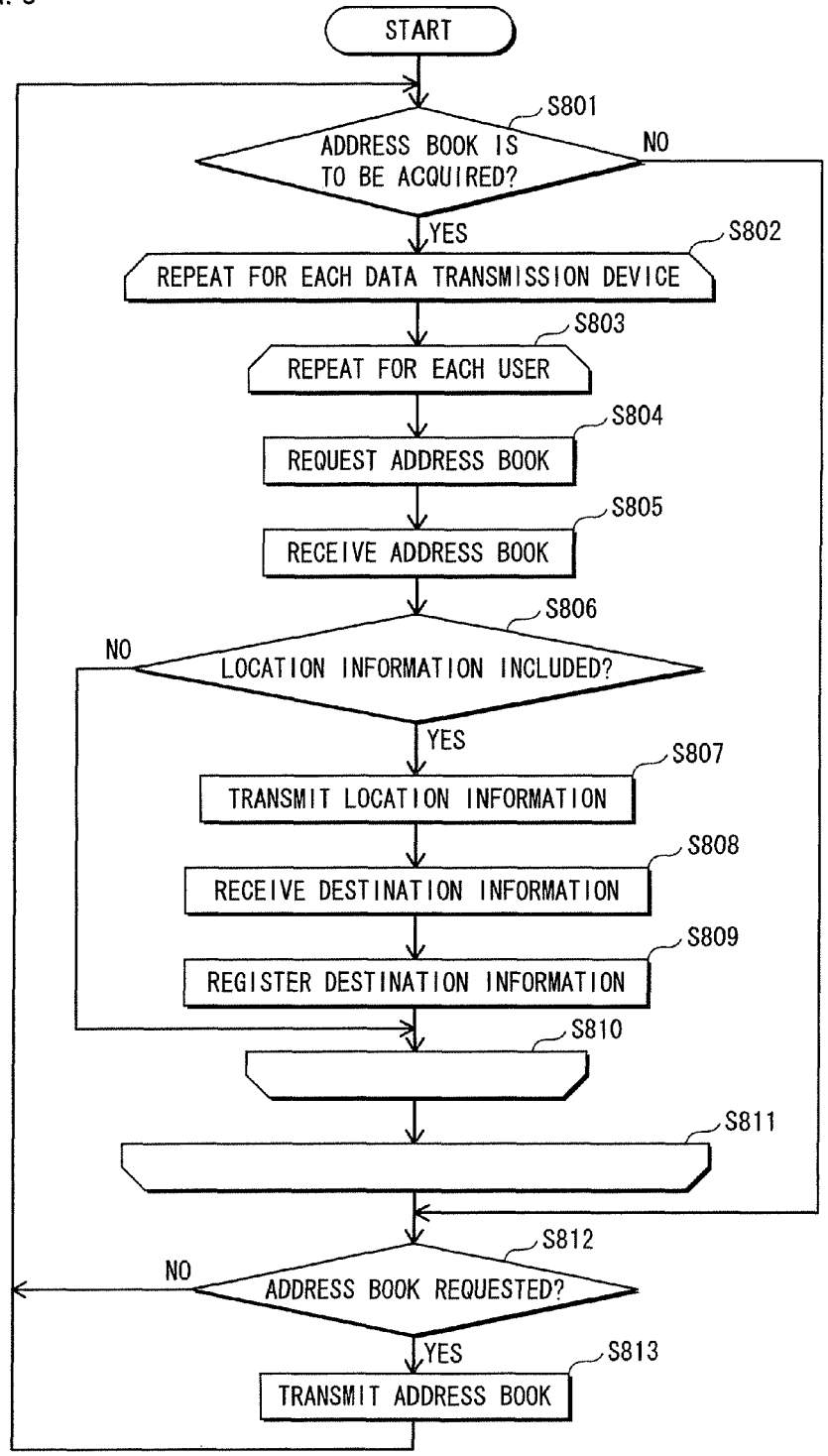
FIG. 8 is a flowchart showing the operations of the destination management device 100 according to the embodiment of the present invention.

FIG. 8 is a flow chart showing the operations of the destination management device 100. As shown in FIG. 8, when receiving from the user (manager) a request of acquiring the address book (S801: Yes), the destination management device 100 performs the following processing for each of the users registered in the data transmission devices 102 and 103 respectively (S802-S811).

The destination management device 100 requests, from the data transmission device, the address book of each user (S804), and receives the address book from the data transmission device (S805). Upon receipt of the address book, the destination management device 100 checks the address book. If the location information is included in the address book (S806: Yes), the destination management device 100 transmits the location information to the data transmission device (S807), and requests the data transmission device to acquire the corresponding destination information.

Upon receiving, from the data transmission device, the destination information corresponding to the location information (S808), the destination management device 100 registers the destination information in the address book (S809).

Also, when requested by the data transmission device the address book of each user (S812: Yes), the destination management device 100 transmits the requested address book to the data transmission device (S813).

The destination management device 100 repeats the above-described processing.

[6] Operations of Data Transmission Devices 102 and 103

The following describes the operations of the data transmission devices 102 and 103.

Figure 9:
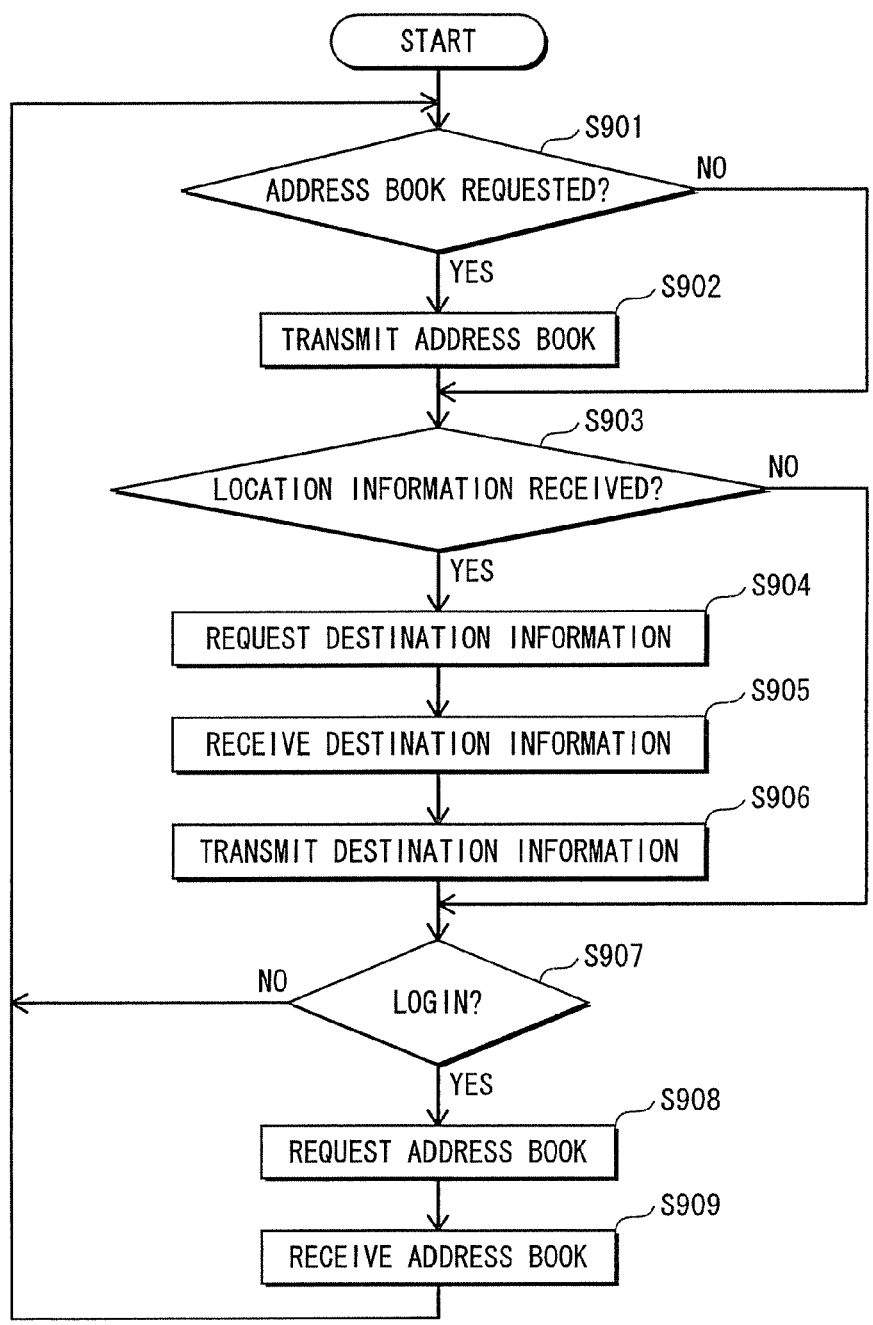
FIG. 9 is a flowchart showing the operations of the data transmission devices 102 and 103 according to the embodiment of the present invention.

FIG. 9 is a flowchart showing the operations of the data transmission devices 102 and 103. As shown in FIG. 9, when requested by the destination management device 100 the address book of each user (S901: Yes), the data transmission device transmits, to the destination management device 100, the address book of each user that has been requested (S902).

Also, upon receipt of the location information from the destination management device 100 (S903: Yes), the data transmission device requests, with use of the location information, the destination information that corresponds to the LDAP server 101 (S904). Then, upon receipt of the destination information from the LDAP server 101 (S905), the data transmission device transmits the destination information to the destination management device 100 (S906).

Upon receipt of the login of a user (S907: Yes), the data transmission device requests from the destination management device 100 the address book of the user (S908), and receives the address book from the destination management device 100 (S909).

In this way, although the destination management device cannot access the directory server, the destination information is acquired via the data transmission device. Therefore, it is possible to save the trouble of transferring the destination information when installing the destination management device.

[7] Variations

While the present invention has been described in accordance with the specific embodiment outlined above, it is evident that the present invention is not limited to such. The following variations are also included in the present invention.

(1) Although not mentioned in the above-described embodiment, the address book of each user may have a data structure as follows. FIG. 10 is a table showing the data structure of the address book of a user. As shown in FIG. 10, the address book of each user according to the present variation has a data structure that lists, for each of the destination names, a plurality of destination information pieces that each indicates a real address, the location information, and the time and date of when the real address was acquired.

Furthermore, it is evident that the present invention is not limited to the data structure described above. A data structure other than the data structure shown in FIG. 10 may be adopted for the present invention.

(2) Although not mentioned in the above-described embodiment, the destination management device may acquire the destination information corresponding to the location information directly from the LDAP server, and not via the data transmission device, if the destination management device can directly access the LDAP server.

Furthermore, the destination management device may acquire the destination information via the data transmission device only when the destination management device has failed to acquire the destination information directly from the LDAP server. This makes possible to lighten the processing load of the data transmission device and the load on the network.

(3) Although not mentioned in the above-described embodiment, the following operations may be executed for acquiring the destination information from the LDAP server.

First, the data transmission device performs a bind operation, which is for starting an LDAP session by transmitting, to the LDAP server, (i) the version number of the LDAP, (ii) the distinguished name of the user (DN: Distinguished Name), and (iii) the authentication information of the user.

Upon receiving, from the LDAP server, a response indicating success in the authentication, the data transmission device performs a search operation that requests the LDAP server to search the destination information by specifying the parameters of "baseObject", "scope", "derefAliases", and "filter" to search the destination information.

Note that the baseObject is a parameter indicating an entry that is included in one of a DIT (Directory Information Tree) and a subtree that are both managed by the LDAP server, and that indicates the DN of an entry that is the starting point of the scope of a search.

Also, the scope is a parameter indicating a type of the search scope, and specifies one of "Starting point entry only", "Entries directly under the starting point entry", and "The Whole subtree including the starting point entry".

The derefAliases is a parameter indicating the scope of a search in a case where the baseObject is an alias entry, or in a case where the alias entry is included in a lower entry of the baseObject. Also, the filter is a parameter that specifies a search condition.

Upon receiving, from the LDAP server, the response of the destination search, the data transmission device performs an unbind operation to end the LDAP session.

(4) Although not mentioned in the above-described embodiment, the operation of the destination management device 100 shown in FIG. 8, and the operations of the data transmission devices 102 and 103 shown in FIG. 9 are performed by the CPU 203 or the CPU 401 reading a control program from a nonvolatile memory (including the HDD), and executing the control program with use of a volatile memory such as a DRAM. In other words, the present invention is also characterized by the programs executed by the CPU 203 and the CPU 401, and an address book acquisition method used by executing the program.

(5) The above embodiment provides a description in a case where the data transmission device is a multi-functional peripheral having functions of scanning, printing, data transmitting and such. However, the present invention is not limited to such. Instead, the data transmission device may be a network scanner or a facsimile.

If the data transmission device is a network scanner, destination information (host name, IP address and such) for transmitting scan data is stored in the address book. If the data transmission device is a facsimile, destination information (telephone number) for transmitting facsimile data is stored in the address book.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A data transmission system connected, via a network, to a data storage device storing destination information without correlation between users and the destination information, the data transmission system comprising:
  a data transmission device; and
  a destination management device for managing the destination information for each user,
  the data transmission device including:
    an address book storage that stores, for each user, an address book;
    an address book transmitter operable to transmit the address book to the destination management device when requested by the destination management device;
    a location information receiver operable to receive, from the destination management device, location information that is included in the address book transmitted to the destination management device by the address book transmitter and that indicates where in the data storage device a destination information piece is stored;
    a destination information acquirer operable to acquire, from the data storage device, the destination information piece indicated by the location information received from the destination management device; and
    a destination information transmitter operable to transmit, to the destination management device, the destination information piece acquired from the data storage device, and
  the destination management device including:
    an address book receiver operable to receive the address book from the data transmission device;

a location information transmitter operable to transmit the location information to the data transmission device, when the location information is included in the address book received from the data transmission device;

a destination information receiver operable to receive, from the data transmission device, the destination information piece indicated by the location information; and a destination information register operable to register the received destination information piece in the received address book.

2. The data transmission system of claim 1, wherein
the location information transmitter of the destination management device transmits the location information to the data transmission device only when the location information is included in the address book received from the data transmission device, and the destination management device has failed to acquire, from the data storage device, the destination information piece indicated by the location information.

3. The data transmission system of claim 1, wherein
the data storage device is an LDAP server.

4. A data transmission device a network interface connecting the data transmission device via a network to a destination management device managing destination information for each user and to a data storage device storing the destination information without correlation between the users and the destination information;

an address book storage that stores, for each user, an address book;

an address book transmitter operable to transmit the address book to the destination management device when requested by the destination management device;

a location information receiver operable to receive, from the destination management device, location information that is included in the address book transmitted to the destination management device by the address book transmitter and that indicates where in the data storage device a destination information piece is stored;

a destination information acquirer operable to acquire, from the data storage device, the destination information piece indicated by the location information received from the destination management device; and a destination information transmitter operable to transmit, to the destination management device, the destination information piece acquired from the data storage device.

5. The data transmission device of claim 4, wherein the data storage device is an LDAP server.

6. An address book acquisition method executed in a data transmission system connected, via a network, to a data storage device storing the destination information without comprising the steps of:

managing in a destination management device destination information for each user;

storing in a data storage device the destination information without correlation between the users and the destination information;

connecting via a network the data transmission system to the data storage device;

when the destination management device requests an address book of each user, transmitting the address book from the data transmission device to the destination management device;

when location information that indicates where in the data storage device a destination information piece is stored is included in the address book received from the data transmission device, transmitting the location information from the destination management device to the data transmission device;

the data transmission device acquiring, from the data storage device, the destination information piece indicated by the location information received from the destination management device;

transmitting, from the data transmission device to the destination management device, the destination information piece acquired from the data storage device; and the destination management device registering, in the received address book, the destination information piece received from the data transmission device.

7. The address book acquisition method of claim 6, wherein
in the step of transmitting the location information from the destination management device to the data transmission device, the location information is transmitted only when the location information is included in the address book received from the data transmission device, and the destination management device has failed to acquire, from the data storage device, the destination information piece indicated by the location information.

8. The address book acquisition method of claim 7, wherein
the data storage device is an LDAP server.

* * * * *